United States Patent
Hall

[15] 3,686,375
[45] Aug. 22, 1972

[54] METHOD OF SEALING OR JOINTING

[72] Inventor: Alan Frank Hall, Stockton-on-tees, England

[73] Assignee: Imperial Chemical Industries Limited, London, England

[22] Filed: May 11, 1970

[21] Appl. No.: 36,004

[30] Foreign Application Priority Data

May 27, 1969 Great Britain..........26,661/69

[52] U.S. Cl. ......................264/32, 264/36, 264/262
[51] Int. Cl. ..........................E04b 1/16, B32b 35/00
[58] Field of Search..........................264/36, 262, 32

[56] References Cited

UNITED STATES PATENTS

| | | |
|---|---|---|
| 3,265,782 | 8/1966 | Rosengarten et al. ........264/36 |
| 3,491,182 | 1/1970 | Hunder et al...............264/262 |
| 3,368,005 | 2/1968 | Buczala et al. ..............264/36 |

*Primary Examiner*—Robert F. White
*Assistant Examiner*—Allen M. Sokal
*Attorney*—Cushman, Darby & Cushman

[57] ABSTRACT

A method of effecting a seal in a system operating under pressure, e.g., a pipeline carrying ethylene at high pressure, wherein the appropriate part of the system is surrounded with a rigid shell containing material, e.g., a synthetic resin, which is allowed to set to form bonds with the shell and the appropriate part of the system capable of withstanding the internal pressure of the system. The method may be used to joint pipes onto pipelines by a modification of the "hot-tapping" technique.

6 Claims, 1 Drawing Figure

PATENTED AUG 22 1972 3,686,375
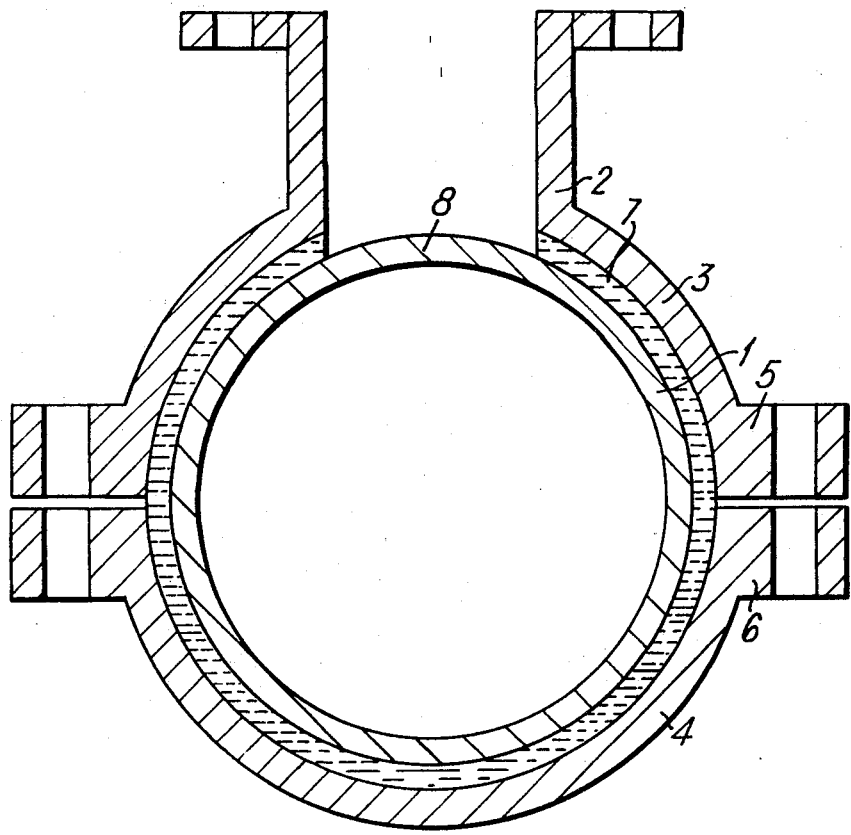
Inventor
ALAN FRANK HALL
By Cushman, Darby & Cushman
Attorneys

METHOD OF SEALING OR JOINTING

This invention relates to a method of sealing or jointing parts, in systems operating under pressure, and is particularly but not exclusively applicable to pipes and pipe-attachments.

Pipelines designed to carry fluids at high pressures for long distances are usually fitted at regular intervals with stop valves, each having a bleed line which makes it possible to blow down the adjacent section of the pipeline. When leaks occur at or between these valves it is possible to effect a repair by blowing down the appropriate sections of the pipeline. This procedure has the following disadvantages:

a. The fluid contained in the sections blown down, which may be of considerable value, will be lost.
b. There will be an interruption in the supply of the fluid carried by the pipeline and, if the recipient is a factory, this will lead to a reduction in its production.
c. The disposal of the contents of the sections blown down may present a problem. For example, if the pipeline is carrying an inflammable gas such as ethylene this may be burned in a transportable flare stack but this is conspicuous and the flame may be smoky.

A branch-pipe may be jointed onto a pipeline operating at a high-pressure without interrupting the flow of fluid therethrough by the technique of "hot-tapping." In this technique the branch-pipe is held in fluid-impermeable contact with the side of the pipeline by a rubber-sealed clamp. The branch pipe is fitted with a valve and an opening is made into the pipeline using a drill operating through a gland. Joints made in this fashion are not regarded as permanent and must eventually be secured by welding. Welding in the presence of gases such as ethylene at high pressures is very hazardous and is not usually attempted. Thus some interruption in the operation of the pipeline must eventually, be accepted even when the technique of "hot tapping" is employed.

According to the present invention we provide a method of forming a seal in a system operating under pressure which comprises surrounding that part of the system where the seal is to be made with a rigid shell containing a material adapted to set to a solid mass which is impervious and inert to fluids present in the system, and allowing the material to set to form bonds with the rigid shell and with the appropriate part of the system, said bonds being capable of withstanding the internal pressure of the system, fluids present in the system being prevented from contacting the material whilst it is setting.

Also according to the invention we provide a method of sealing a leak in a wall of a system operating under pressure which comprises surrounding the part of the wall containing the leak with a rigid shell containing a material adapted to set to a solid mass which is impervious and inert to fluids present in the system and allowing the material to set to form bonds with the rigid shell and the wall, said bonds being capable of withstanding the internal pressure of the system, means being provided whilst the material is setting to enable fluid leaking from the system to escape through the shell.

Further according to the invention we provide a method of joining a pipe to a system operating under pressure by forming a seal between an end of the pipe and an outer wall of the system and subsequently connecting the pipe to the interior of the system wherein the seal is formed by surrounding the end of the pipe and the appropriate part of the wall of the system with a rigid shell containing a material adapted to set to a solid mass which is impervious and inert to fluids present in the system, and allowing the material to set to form bonds with the rigid shell, the wall and the end of the pipe, said bonds being capable of withstanding the internal pressure of the system.

The method of the invention is very suitable for effecting repairs of a minor kind in systems which must remain at pressure during the repair operation. In particular it is very suitable for repairing leaks occurring in pipelines carrying fluids at high pressures. Such leaks generally occur at mechanical fittings or welds in the pipelines, e.g., at the stop valves which are usually fitted at regular intervals along the pipelines. The method is also very suitable as a modification of the "hot-tapping" technique for jointing branch-pipes onto pipelines and other systems under pressure, since it provides a more permanent seal than is obtainable when conventional rubber-sealed clamps are used and avoids the necessity of welding the joint at a later stage.

The rigid shell is preferably formed from a strong metal, especially steel, particularly when the pressure within the system is high. The shell may be formed in any suitable shape which will surround the part of the system where a seal or joint is to be made. Very conveniently the shell may be in the form of a box of suitable dimensions. Suitably the shell is constructed in a plurality of sections, preferably two, which are joined, e.g., bolted, together around the appropriate part of the system. When the shell is constructed in the form of a box, it need not be similar in shape to the part of the system it is to surround but preferably the space between the inner walls of the box and the wall of the system is not too great. When the part of the system to be surrounded is complex in shape, e.g., a stop valve on a pipeline, it is preferred to take a casting of the part, using, e.g., a Silicoset casting rubber. From the casting a plaster positive may be made which can be used to determine the dimensions of the box.

When the method is used to repair a leak in a system under pressure, an opening should be provided at an appropriate place in the rigid shell to enable fluid escaping from the leak to pass through the shell. Preferably the area immediately surrounding the leak is sealed temporarily in some suitable manner which allows fluid to pass out only through a narrow vent, such as a plastic (e.g., P.T.F.E.) tube of narrow bore. When the rigid shell is fitted around the leak, the tube may be arranged to pass through the opening provided in the shell. When the material contained within the shell has set, the tube may be removed and the resulting hole closed by any suitable means.

The choice of the material which is allowed to set between the rigid shell and the wall of the system depends upon the nature of the system and upon the fluids present in it. Suitable materials in many cases are synthetic resins such as polyester, phenol/formaldehyde and, particularly, epoxy resins. Especially suitable epoxy resins in many cases are epoxy resin mortars based on Araldite GY 250.

When the method of the invention is used to modify the "hot-tapping" technique for jointing a branch pipe onto a pipeline, the rigid shell may be in the form of a clamp passing round the pipeline and forming the end of the branch pipe in contact therewith. When the end of the branch pipe has been sealed onto the pipeline by the method of the invention, a hole is formed in the pipeline by a drill operating through a gland in the conventional manner.

The invention is illustrated by the following Examples and by the accompanying drawing which illustrates the method of Example 2.

EXAMPLE 1

A trial of the method of the invention was carried out on a pipeline designed to carry ethylene at pressures up to 1,400 psig. The pipeline was 8 inches in diameter and was fitted at regular intervals with stop valves each having a bleed line which made it possible to blow down the adjacent section of the pipeline. A leak, which had occurred at the flanged joint to the bleed line on one of the stop valves, was sealed whilst the pipeline was operating at a pressure of 600 psig.

A casting of the portion of the pipeline assembly in the immediate vicinity of the leak, which was complex in shape, was taken using a Silicoset casting rubber. From this casting a plaster positive was made which was used to determine the dimensions of a steel box which was built to encase the leaking joint, allowing a small space between the joint and the internal walls of the box. The box was designed to withstand pressures of up to 1,800 p.s.i.g. and was split into two sections (one of which was provided with a passage for a temporary vent) for in situ assembly around the leaking joint.

In preparation for the repair, the surface of the pipeline in the immediate vicinity of the leak was shot blasted using Vacublast equipment operated by means of a mobile air compressor. The space between the flanges of the joint was sealed in such a manner as to allow a 1/16 of an inch P.T.F.E. tube to act as a temporary vent, the tube being located so as to pass through the passage provided in the steel box. Since the exact position of the leak was unknown it was necessary, before the space between the flanges was sealed, to provide a leakage path to the P.T.F.E. tube. This was done by winding a string loop between the flanges. The space between the flanges outside the string loop was then filled with a quick setting epoxy mortar based on Araldite MY 753 with Hardener X83/144 which was allowed to set for 3 hours after which time a check test indicated that the vent was functioning properly and that no pressure would be placed upon the resin to be placed in the steel box before curing was complete. At this stage the interior surfaces of the sections of the box and the surface of the pipeline assembly to be surrounded thereby were heavily coated with an epoxy resin mortar based on Araldite GY 250, the total amount of resin used being in excess of that required to fill the space between the joint and the walls of the box. The sections of the box were then bolted together around the joint with the P.T.F.E. tube issuing from the passage provided for it, and the assembly left for 72 hours for the resin to set and cure. After this time a check test showed that the leak was now controlled and that gas was issuing only by way of the P.T.F.E. tube.

The P.T.F.E. tube was now withdrawn and the resulting hole filled using epoxy resin introduced by means of a hypodermic syringe and the vent passage closed. The assembly was tested for leaks by surrounding it with clay and filling the intervening space with soapy water. When no leakage had been detected after 3 days the seal was taken to be sound. The assembly was protected against ground water corrosion by coating with Bitugel and the pipeline recovered with earth.

EXAMPLE 2

The drawing shows in cross-sectional elevation, the jointing of a branch-pipe to a pipeline operating at a high pressure, using the method of the invention, at an intermediate stage during the operation.

A branch-pipe 2, diameter 3 inches, is to be jointed onto a pipe-line 1, diameter 8 inches, operating at a pressure of 1,400 psig., without the pipeline being shut down. A split clamp having upper and lower parts 3 and 4 respectively is made for pipeline 1. Branch-pipe 2 is welded onto upper part 3 of the split clamp. The outer surface of pipeline 1 and the inner surfaces of parts 3 and 4 of the clamp are shot blasted and epoxy resin is applied to each surface. Parts 3 and 4 of the clamp are fitted round pipeline 1 and bolted together through flanges 5 and 6. The resin is allowed to set to form a layer 7 between pipeline 1 and the clamp. At this stage the joint is as illustrated in the drawing. A valve (not shown in the drawing) is fitted to the open end of branch-pipe 2 and a drilling device of the type used in conventional "hot-tapping" operations is placed on top of the valve. A hole is then drilled through the part 8 of the wall of pipeline 1.

I claim:

1. A method of sealing a leak in a wall of a system operating under internal fluid pressure which comprises venting said leak to the atmosphere through at least one tube, surrounding the part of the wall containing the leak with a rigid shell containing a material adapted to set to a solid mass which is impervious and inert to fluids present in the system and allowing the material to set to form bonds with the rigid shell and the wall, said bonds being capable of withstanding the internal pressure of the system, continuously conducting fluid leaking from the system to the atmosphere through said at least one tube and said rigid shell surrounding the settable mass while the latter is setting so as to prevent such fluid from contacting the setting material, and withdrawing said at least one tube and filling the resulting hole after the mass has set.

2. A method according to claim 1 wherein the rigid shell is formed from steel.

3. A method according to claim 1 wherein the rigid shell is constructed in a plurality of sections which are joined together around the appropriate part of the system.

4. A method according to claim 1 wherein the material is a synthetic resin selected from the group consisting of polyester, phenol/formaldehyde and epoxy resins.

5. A method as in claim 1 wherein the vent is closed by filling it with settable material.

6. A method as in claim 1 wherein the system is operating at an internal pressure of between about 600 to 1,400 psig.

* * * * *